US009602470B2

(12) United States Patent
Lien

(10) Patent No.: US 9,602,470 B2
(45) Date of Patent: Mar. 21, 2017

(54) NETWORK DEVICE, IPSEC SYSTEM AND METHOD FOR ESTABLISHING IPSEC TUNNEL USING THE SAME

(71) Applicant: Sercomm Corporation, Taipei (TW)

(72) Inventor: Chia-Hao Lien, New Taipei (TW)

(73) Assignee: SERCOMM CORPORATION, Taipei (TW)

( * ) Notice: Subject to any disclaimer, the term of this patent is extended or adjusted under 35 U.S.C. 154(b) by 136 days.

(21) Appl. No.: 14/224,096

(22) Filed: Mar. 25, 2014

(65) Prior Publication Data

US 2014/0351590 A1 Nov. 27, 2014

Related U.S. Application Data

(60) Provisional application No. 61/826,551, filed on May 23, 2013.

(30) Foreign Application Priority Data

Dec. 12, 2013 (TW) .............................. 102145927 A

(51) Int. Cl.
*H04L 9/32* (2006.01)
*H04L 29/06* (2006.01)
*H04L 29/12* (2006.01)

(52) U.S. Cl.
CPC ........ *H04L 63/029* (2013.01); *H04L 61/2514* (2013.01); *H04L 61/2592* (2013.01);
(Continued)

(58) Field of Classification Search
CPC ............. H04L 12/4641; H04L 12/4633; H04L 63/0272; H04L 29/12009
(Continued)

(56) References Cited

U.S. PATENT DOCUMENTS 6,330,562 B1 * 12/2001 Boden ................. H04L 12/4641
707/694
7,079,499 B1 * 7/2006 Akhtar .................... H04L 63/08
370/310
(Continued)

FOREIGN PATENT DOCUMENTS

CN 101667918 A 3/2010
CN 102598634 A 7/2012

OTHER PUBLICATIONS

Understanding VPN IPSEC Tunnel Mode and IPSEC Transport Mode—What's the Difference? Written by Administrator on May 6, 2012. Posted in Network Protocols (/networking-topics/protocols. html).

*Primary Examiner* — Thu Ha Nguyen
(74) *Attorney, Agent, or Firm* — McClure, Qualey & Rodack, LLP

(57) ABSTRACT

A network device is provided. The network device is connected to a number of slave network devices. Each slave network device communicates with the network device by using an Internet protocol (IP) address. The network device includes an Internet protocol security (IPsec) module and a network address translation (NAT) module. The IPsec module establishes an IPsec tunnel to a network gateway in the Internet and retrieves an IPsec IP address corresponding to the IPsec tunnel. The NAT module converts the IP addresses of the slave network devices to the IPsec IP address, such that the slave network devices use the IPsec IP address to communicate with the network gateway through the IPsec tunnel.

20 Claims, 5 Drawing Sheets

(52) U.S. Cl.
CPC ...... *H04L 63/0272* (2013.01); *H04L 63/0428* (2013.01); *H04L 63/0471* (2013.01); *H04L 63/164* (2013.01)

(58) Field of Classification Search
USPC ........ 709/229, 205, 227, 238; 713/168, 153, 713/167; 370/392; 726/14, 1, 12, 15
See application file for complete search history.

(56) References Cited

U.S. PATENT DOCUMENTS

| | | | |
|---|---|---|---|
| 7,086,086 B2* | 8/2006 | Ellis | H04L 63/0272 713/153 |
| 7,099,319 B2* | 8/2006 | Boden | H04L 12/4641 370/389 |
| 7,143,137 B2* | 11/2006 | Maufer | H04L 29/12018 709/205 |
| 7,159,242 B2 | 1/2007 | Genty et al. | |
| 7,441,043 B1* | 10/2008 | Henry | H04L 29/1233 709/238 |
| 7,908,651 B2* | 3/2011 | Maher | H04L 12/4633 709/227 |
| 7,987,506 B1* | 7/2011 | Khalid | H04L 12/4633 370/401 |
| 8,046,829 B2* | 10/2011 | Oba | H04L 63/08 726/14 |
| 8,130,768 B1* | 3/2012 | Ahrens | H04L 45/00 370/352 |
| 8,516,539 B2* | 8/2013 | Kumar | G06F 21/552 713/153 |
| 8,745,722 B2* | 6/2014 | Niemi | H04L 63/0272 370/401 |
| 2002/0046348 A1* | 4/2002 | Brustoloni | H04L 29/12367 726/6 |
| 2002/0091921 A1* | 7/2002 | Kunzinger | H04L 63/0428 713/153 |
| 2002/0141352 A1* | 10/2002 | Fangman | H04L 29/06027 370/254 |
| 2003/0212907 A1* | 11/2003 | Genty | H04L 29/12009 726/14 |
| 2004/0225895 A1* | 11/2004 | Mukherjee | H04L 12/4633 726/15 |
| 2005/0185647 A1* | 8/2005 | Rao | H04L 12/4641 370/392 |
| 2006/0047836 A1* | 3/2006 | Rao | H04L 63/0272 709/229 |
| 2007/0053328 A1* | 3/2007 | Riittinen | H04L 63/0272 370/338 |
| 2007/0064661 A1* | 3/2007 | Sood | H04L 29/12481 370/338 |
| 2008/0072312 A1* | 3/2008 | Takeyoshi | H04L 12/4641 726/15 |
| 2008/0201486 A1* | 8/2008 | Hsu | H04L 29/06 709/238 |
| 2009/0158418 A1* | 6/2009 | Rao | H04L 63/0272 726/12 |
| 2009/0207843 A1* | 8/2009 | Andreasen | H04L 12/1403 370/392 |
| 2012/0214445 A1 | 8/2012 | Stojanovski et al. | |
| 2013/0205040 A1* | 8/2013 | Naor | H04L 61/2592 709/238 |
| 2014/0351590 A1* | 11/2014 | Lien | H04L 63/029 713/168 |

* cited by examiner

NETWORK DEVICE, IPSEC SYSTEM AND METHOD FOR ESTABLISHING IPSEC TUNNEL USING THE SAME

This application claims the benefit of U.S. provisional application Ser. No. 61/826,551, filed May 23, 2013, and the benefit of Taiwan application Serial No. 102145927, filed Dec. 12, 2013, the subject matters of which are incorporated herein by reference.

BACKGROUND

Field of the Invention

The disclosure relates in general to a network device, and more particularly to a network device related to Internet protocol security (IPsec), an IPsec system and a method for establishing IPsec tunnel using the same.

Related Art

As the Internet and mobile communication become popular, the requirement for the security level of data transmission on the Internet increases. It becomes more and more important to transmit data with IPsec. Thus there is a need for reducing hardware cost and providing convenience to an end user for secure data transmission using IPsec.

SUMMARY

The disclosure is directed to a network device, an IPsec system and a method for establishing IPsec tunnel using the same.

According to one embodiment, a network device is provided. The network device is connected to a number of slave network devices. Each slave network device communicates with the network device by using an Internet protocol (IP) address. The network device includes an Internet protocol security (IPsec) module and a network address translation (NAT) module. The IPsec module establishes an IPsec tunnel to a network gateway in the Internet and retrieves an IPsec IP address corresponding to the IPsec tunnel. The NAT module converts the IP addresses of the slave network devices to the IPsec IP address, such that the slave network devices use the IPsec IP address to communicate with the network gateway through the IPsec tunnel.

According to another embodiment, an IPsec system is provided. The IPsec system includes a network gateway and a network device. The network gateway is connected to an intranet. The intranet is connected to the Internet via the network gateway. The network device is connected to a plurality of slave network devices. Each of the slave network devices communicates with the network device by using an IP address. The network device includes an IPsec module and a NAT module. The IPsec module establishes an IPsec tunnel to the network gateway in the Internet and retrieves an IPsec IP address corresponding to the IPsec tunnel. The NAT module converts the IP addresses of the slave network devices to the IPsec IP address, such that the slave network devices use the IPsec IP address to communicate with the network gateway through the IPsec tunnel.

According to another embodiment, a method for establishing IPsec tunnel is provided. The method includes steps of: establishing an IPsec tunnel from a network device to a network gateway and retrieving an IPsec IP address corresponding to the IPsec tunnel, the network device connecting a plurality of slave network devices, each of the slave network devices communicating with the network device by using an IP address, and converting the IP addresses of the slave network devices to the IPsec IP address, such that the slave network devices use the IPsec IP address to communicate with the network gateway through the IPsec tunnel.

Figure 1:
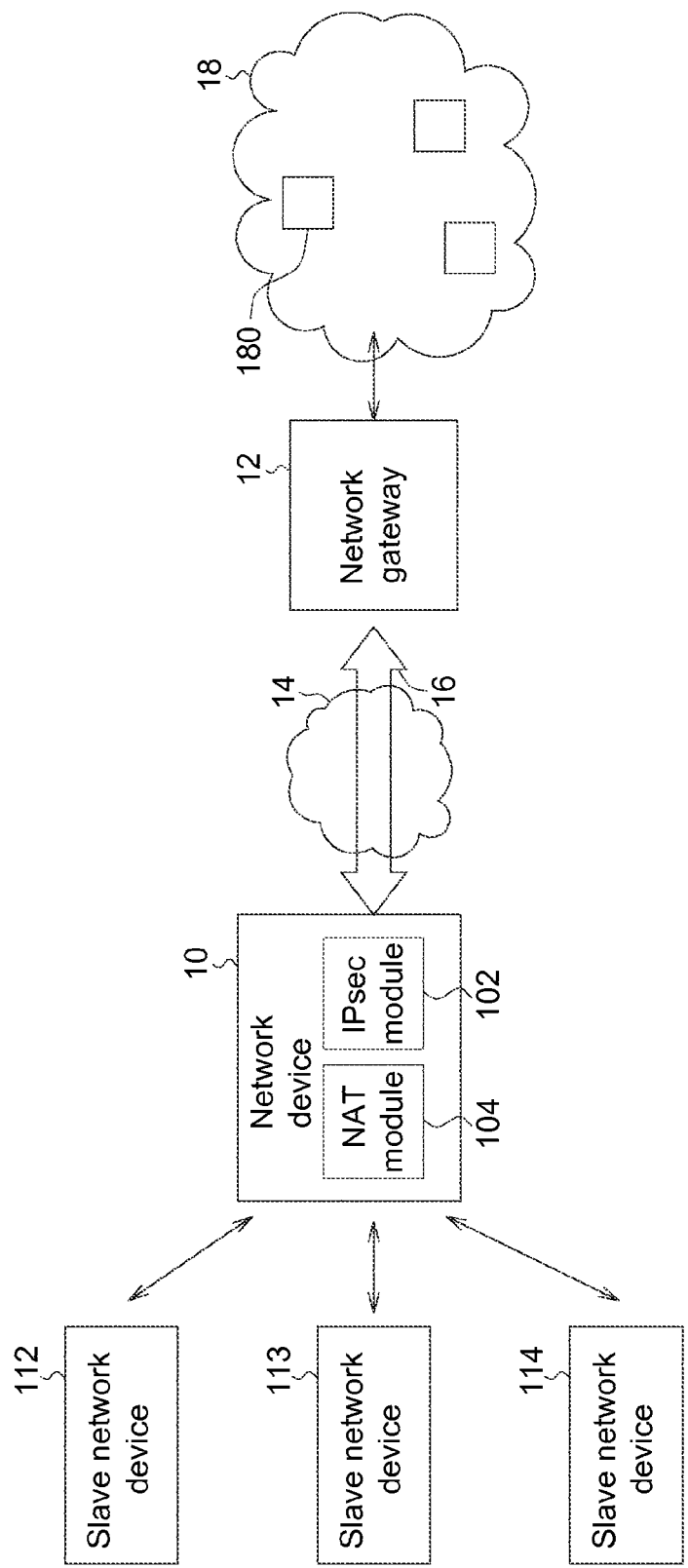
FIG. 1 shows a diagram of a network device and an IPsec system using the same according to one embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 shows a diagram of a network device and an IPsec system using the same according to one embodiment of the invention. The network device 10 connects multiple slave network devices 112-114. Each of the slave network devices 112-114 communicates with the network device 10 by using an IP address. The network device 10 includes an IPsec module 102 and a NAT module 104. The IPsec module 102 establishes an IPsec tunnel 16 to a network gateway 12 in the Internet 14 and retrieves an IPsec IP address corresponding to the IPsec tunnel 16. The NAT module 104 converts the IP addresses of the slave network devices 112-114 to the IPsec IP address, such that the slave network devices 112-114 use the IPsec IP address to communicate with the network gateway 12 through the IPsec tunnel 16.

The term "connect" used in this disclosure may refer to connect directly or indirectly. It may also refer to wired connection or wireless connection. For example, the network device 10 and the slave network devices 112-114 may be connected via cable or via wireless network. The example shown in FIG. 1 includes three slave network devices. It should be noted that in practice there may be more than three or fewer than three slave network devices.

The network device 10 may be a cellular base station, a router, or a wireless access point (AP). Each of the slave network devices 112-114 may be a cellular base station, a router, a wireless AP, or a mobile device. Each of the slave network devices may be different from each other, or some of them may be the same. For example, in an ordinary user home, the network device 10 may be a small cell such as a femtocell, and the slave network devices 112, 113, 114 connected to the network device 10 may be a router, a wireless AP, a user's mobile phone, respectively.

The slave network devices 112-114 and the network device 10 may constitute a part of a local area network (LAN). Each slave network device 112-114 has different private IP address, such as IP addresses in the reserved range 192.168.0.0-192.168.255.255. The network device 10 also has a private IP address. In the example shown in FIG. 1, slave network devices 112-114 have private IP addresses 192.168.1.2-192.168.1.4, respectively, and the network device 10 has a private IP address 192.168.1.1. In this local area network, slave network devices 112-114 communicate with the network device 10 by using the private IP addresses. In addition, slave network devices 112-114 are connected to the Internet 14 via the network device 10. The network device 10 also possesses a public IP address in the Internet 14, which is the global IP address 200.0.0.3.

The network gateway 12 is connected to an intranet 18, and the intranet 18 is connected to the Internet 14 via the network gateway 12. Intranet 18 may be a local area network of a company or a core network of a telecommunication service provider. For example, in a 4G long term evolution (LTE) wireless communication system, the intranet 18 may be an evolved packet core (EPC). The network gateway 12 controls the packets to be transmitted between the intranet 18 and the Internet 14. The network gateway 12 may be a security gateway.

When the slave network device 112 needs to establish a secure connection to a remote host 180 that is in the intranet 18, IPsec tunnel mode is used to establish the secure connection. The slave network device 112 needs to pass through the network device 10 in order to connect to the Internet 14. In order to connect to the intranet 18 from the Internet 14, it is required to pass through the network gateway 12. The IPsec module 102 of network device 10 establishes the IPsec tunnel 16 to the network gateway in IPsec tunnel mode, and the NAT module 104 of the network device 10 converts the IP address of the slave network device 112. The operation is described in detail as follows.

Figure 2:
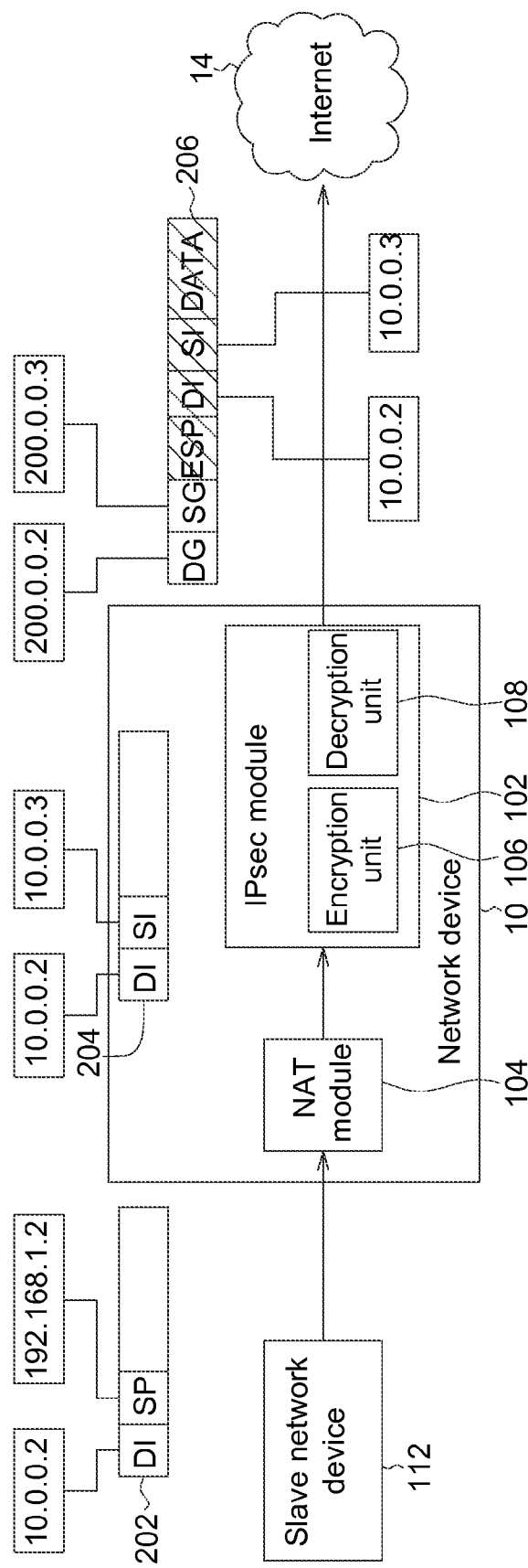
FIG. 2 shows a diagram of a network device transmitting a packet to the Internet.

FIG. 2 shows a diagram of a network device transmitting a packet to the Internet. When the slave network device 112 needs to transmit data to the remote host 180 with IPsec, the slave network device 112 transmits a packet 202 to the network device 10. The packet 112 includes a field DI that records the destination IPsec IP address and a field SP that records the source private IP address. The IPsec IP address used here is in the reserved address range for private networks. In the example shown in FIG. 2, IPsec IP address is in the range of 10.0.0.0-10.255.255.255. The IPsec IP address of the remote host 180 to be connected is 10.0.0.2, and the private IP address of the slave network device 112 that sends a request is 192.168.1.2. Thus the packet 202 contains a destination IPsec IP address (field DI) 10.0.0.2 and a source private IP address (field SP) 192.168.1.2. The slave network device 112 transmits the packet 202 to the network device 10.

After the network device 10 receives the packet 202, the NAT module 104 converts the private IP address of the slave network device 112 to the IPsec IP address used by the network device 10. The retrieving of the IPsec IP address of the network device 10 is described as follows.

When the IPsec module 102 of the network device 10 sends a request to establish the IPsec tunnel 16 to the network gateway 12 through the Internet 14, the network gateway 12 sends a certificate for authentication. After succeeding in authentication, the network gateway 12 assigns an IPsec IP address to the network device 10. In this way the IPsec module 102 establishes the IPsec tunnel 16 to the network gateway 12 in the Internet 14 and retrieves the IPsec IP address corresponding to the IPsec tunnel 16. In the example shown in FIG. 2, the IPsec IP address retrieved by the IPsec module 102 is 10.0.0.3.

The NAT module 104 converts the source private IP address 192.168.1.2 of the slave network device 112 (field SP in packet 202) to the IPsec IP address 10.0.0.3 of the network device 10. This source IP address 10.0.0.3 is recorded in a field SI of the packet 204 that is transmitted from the NAT module 104 to the IPsec module 102.

The NAT module 104 converts private IP addresses of the slave network devices 112-114 to the IPsec IP address of the network device 10, and the NAT module 104 records the relationship between the private IP addresses of the slave network devices 112-114 and ports of the network device 10 in a NAT lookup table. An example of a NAT lookup table is shown in the table 1 below.

TABLE 1

| Source address | Convert to address | Remote address |
|---|---|---|
| 192.168.1.2:80 | 10.0.0.3:90 | 10.0.0.2:8080 |
| 192.168.1.3:80 | 10.0.0.3:91 | 10.0.0.2:8080 |
| 192.168.1.4:80 | 10.0.0.3:92 | 10.0.0.2:8080 |

The NAT module converts private IP addresses of the slave network device 112 (with private IP address 192.168.1.2), slave network device 113 (with private IP address 192.168.1.3), and slave network device 114 (with private IP address 192.168.1.4) to the same IPsec IP address 10.0.0.3. That is, different slave network devices 112-114 use the same IPsec IP address to communicate with the network gateway 12 through the same IPsec tunnel 16. On the other hand, different slave network devices 112-114 correspond to different ports of the network device 10. Therefore, when the network device 10 receives a packet from the network gateway 12 through the Internet 14, the network device 10 can identify which slave network device the packet is forwarded to according to the port information recorded in the packet.

After receiving the packet 204, the IPsec module 102 may encrypt the entire packet 204. The IPsec module 102 includes an encryption unit 106 and a decryption unit 108. When the network device 10 transmits the packet generated by the slave network device 112 to the Internet 14, the encryption unit 106 may perform an encryption operation on the packet 204 and appends an encapsulating security payload (ESP) header to the packet 204. As shown in FIG. 2, the encrypted portion of the packet 206 includes ESP header (field ESP), destination IPsec IP address (field DI), source IPsec IP address (field SI) and data (field DATA). Then the IPsec module 102 further appends the source global IP address (field SG) and the destination global IP address (field DG) to the packet. In the example shown in FIG. 2, the global IP of the network device 10 is 200.0.0.3, and the global IP of the network gateway 12 is 200.0.0.2. The packet 206 is transmitted on the Internet 14 wherein a portion of the packet 206 (fields shown in the shaded region) is encrypted. Therefore, even if the packet 206 transmitted on the Internet 14 has been eavesdropped, only the information recorded in the field DG and field SG is revealed. The fields encrypted are safe from eavesdropping and hence a secure connection can be achieved.

Figure 3:
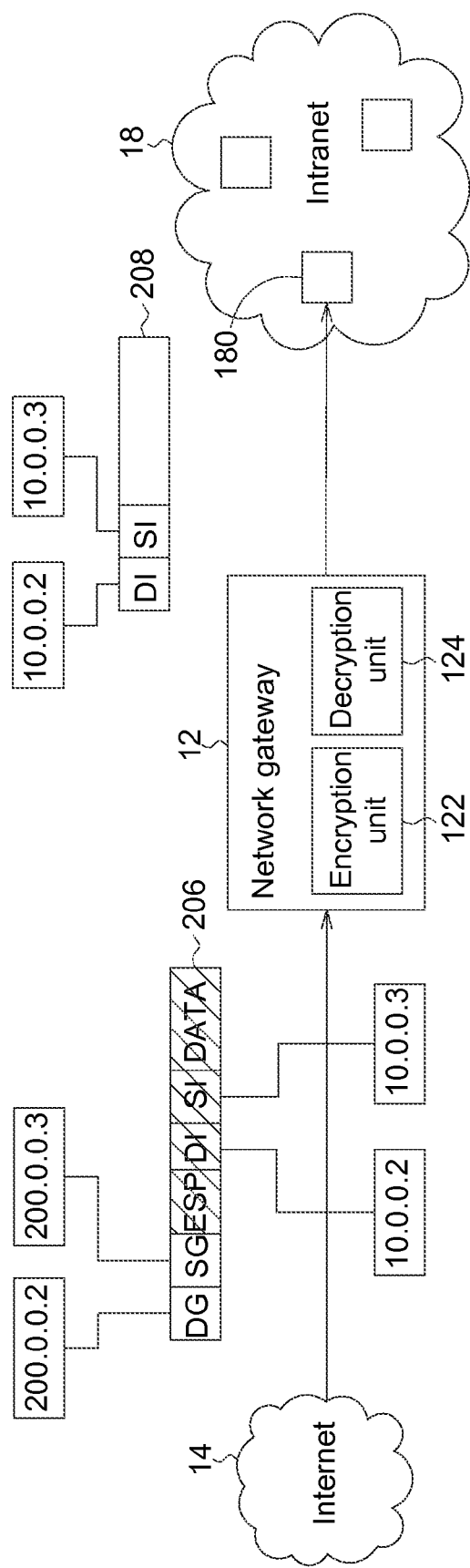
FIG. 3 shows a diagram of a network gateway receiving a packet from the Internet.

FIG. 3 shows a diagram of a network gateway receiving a packet from the Internet. The network gateway 12 includes an encryption unit 122 and a decryption unit 124. After receiving the packet 206 from the Internet 14, the decryption unit 124 decrypts the packet 206 and generates a packet 208 recording the source IPsec IP address (field SI) and the destination IPsec IP address (field DI). Based on the content in the field DI (10.0.0.2 in this example), the network gateway 12 can transmit the packet 208 to the remote host 180 having IPsec IP address 10.0.0.2 in the intranet 18.

FIG. 2, FIG. 3 and the description above shows the process of transmitting data from the slave network device 112 to the remote host 180. In the following paragraphs, the process of transmitting data from the remote host 180 to the slave network device 112 is described in accompany with FIG. 4 and FIG. 5.

Figure 4:
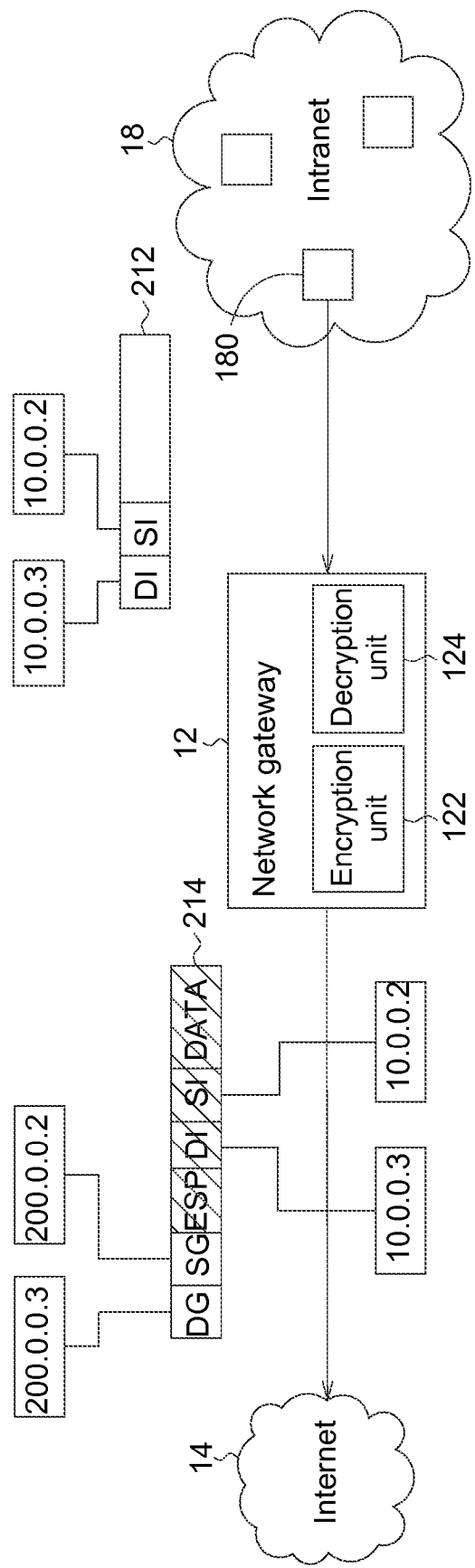
FIG. 4 shows a diagram of a network gateway transmitting a packet to the Internet.

FIG. 4 shows a diagram of a network gateway transmitting a packet to the Internet. The packet 212 transmitted from the remote host 180 contains a destination IPsec IP address (field DI) 10.0.0.3 and a source IPsec IP address (field SI) 10.0.0.2. After the network gateway 12 receives the packet 212, the encryption unit 122 performs an encryption operation on the packet 212 to append an ESP header. Then a source global IP address (field SG) 200.0.0.2 and a destination global IP address (field DG) 200.0.0.3 are further appended to generate the packet 214 to be transmitted on the Internet 14. The shaded region shown in FIG. 4 is the encrypted portion of the packet 214.

Figure 5:
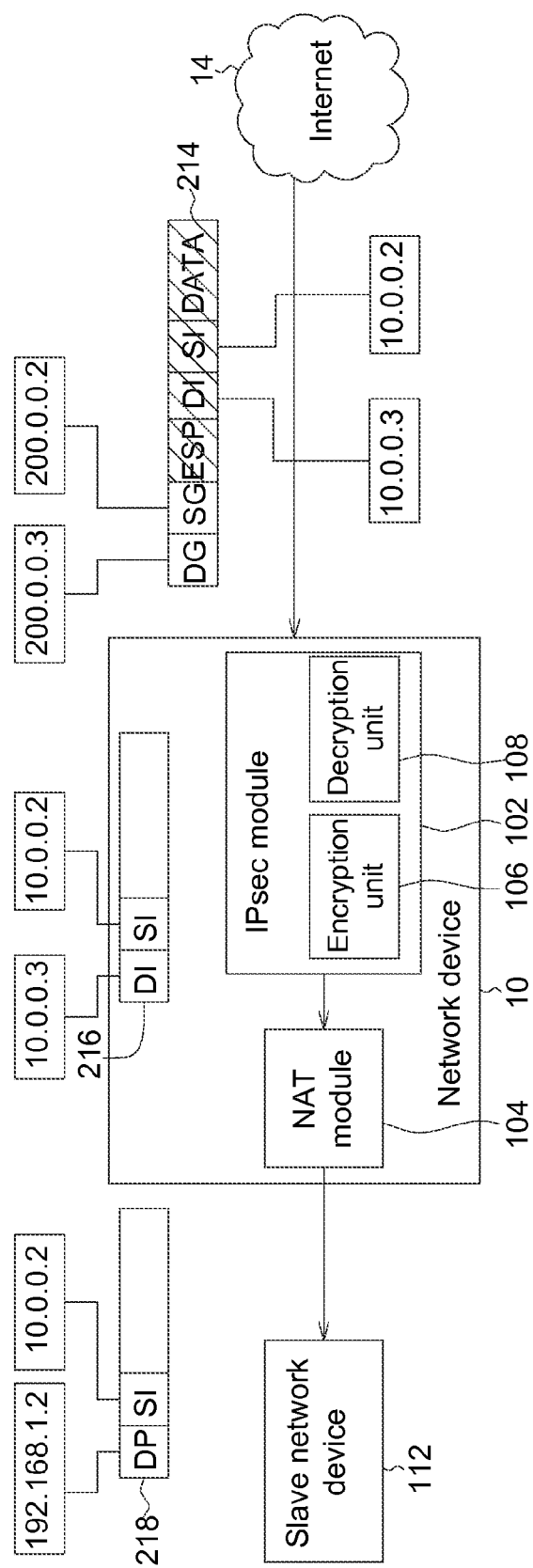
FIG. 5 shows a diagram of a network device receiving a packet from the Internet.

FIG. 5 shows a diagram of a network device receiving a packet from the Internet. After the network device 10 receives the packet 214 from the Internet 14, the decryption unit 108 of the IPsec module 102 decrypts the packet 214 to generate packet 216, which records the source IPsec IP address (field SI) 10.0.0.2 and the destination IPsec IP address (field DI) 10.0.0.3. Based on the port information (e.g. port 90) recorded in the packet 214 or in the packet 216, the NAT module 104 looks up the internal NAT lookup table (as shown in table 1) to determine that the packet is to be forwarded to private IP address 192.168.1.2. Accordingly the NAT module 104 generates a packet 218 recording the source IPsec IP address (field SI) 10.0.0.2 and the destination private IP address (field DP) 192.168.1.2. The NAT module 104 transmits the packet 218 to the slave network device 112. Thus the process of transmitting data from the remote host 180 to the slave network device 112 has been completed.

According to the network device and the IPsec system described in the above embodiments, different IP addresses of the slave network devices are converted by the NAT module to the same IPsec IP address. Therefore, multiple slave network devices, such as wireless AP, router, and femtocell, can share a common IPsec tunnel and use the same IPsec IP address to communicate with a remote network gateway. As such, even if multiple slave network devices are required to transmit data with IPsec, only one IPsec tunnel is needed. Therefore the storage capacity and the computing capability of the network device that performs the IPsec functionality can be reduced effectively. Furthermore, the network gateway only has to send one certificate for those slave network devices. The number of certificates sent by the network gateway can be reduced and thus the cost can be reduced as compared to the conventional approach.

In addition, in the architecture shown in the above embodiments, only the network device is required to perform tasks related to IPsec data transmission, including authentication, encryption and decryption operation during the IPsec process. Slave network devices do not have to perform such tasks, especially the encryption/decryption operations that usually require high computational complexity and high power consumption. Therefore, not only the cost of slave network devices can be greatly reduced, but also the system is easily expandable for a user. For example, a router that does not have IPsec functionality, or a general smart phone, can be added to the IPsec system easily to transmit data with IPsec via the network device having IPsec functionality. Specifically, as long as the router, or the smart phone, enters the same local area network as the network device resides, the router is added to the IPsec system by connecting to the network device. As such, a new slave network device can be easily added by a user to the IPsec system that already exists.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A network device for connecting a plurality of slave network devices, each of the slave network devices communicating with the network device by using a different Internet protocol (IP) address, the network device comprising:
   an Internet protocol security (IPsec) module for establishing an IPsec tunnel to a network gateway in the Internet and retrieving an IPsec IP address corresponding to the IPsec tunnel; and
   a network address translation (NAT) module for converting the different IP addresses of the slave network devices to the same IPsec IP address, such that the slave network devices share the IPsec tunnel and use the same IPsec IP address to communicate with the network gateway through the IPsec tunnel;
   wherein at least one of the IPsec module and the NAT module is implemented by a processor;
   wherein the IPsec tunnel ends at the network device and the network gateway without extending to any of the slave network devices.

2. The network device according to claim 1, wherein the network device is a cellular base station, a router, or a wireless access point (AP), each of the slave network devices is a cellular base station, a router, a wireless AP, or a mobile device, and the network gateway is a security gateway.

3. The network device according to claim 1, wherein the IPsec module comprises an encryption unit and a decryption unit, the encryption unit encrypts packets that are initiated from the slave network devices and not protected by IPsec encryption into packets that are protected by IPsec encryption, and the decryption unit decrypts packets that are destined for the slave network devices and protected by IPsec encryption into packets that are not protected by IPsec encryption, and the slave network devices share the services provided by the encryption unit and the decryption unit of the IPsec module of the network device.

4. The network device according to claim 1, wherein the slave network devices communicate with the network device by using different private IP addresses, the NAT module converts the different private IP addresses of the slave network devices to the same IPsec address, and the NAT module records the relationship between the different private IP addresses of the slave network devices and ports of the network device in a NAT lookup table.

5. The network device according to claim 1, wherein the slave network devices communicate with the network device by using different private IP addresses, the NAT module converts the same IPsec address to the different private IP addresses of the slave network devices, and the NAT module records the relationship between the different private IP addresses of the slave network devices and ports of the network device in a NAT lookup table.

6. The network device according to claim 1, wherein the IPsec module is configured in IPsec tunnel mode to establish the IPsec tunnel to the network gateway in the Internet, and to establish the IPsec tunnel for the slave network devices to share, the network device receives only one certificate for authentication from the network gateway.

7. The network device according to claim 1, wherein the slave network devices do not have IPsec functionality and are not capable of performing IPsec encryption and decryption.

8. An IPsec system, comprising:
a network gateway for connecting an intranet, the intranet being connected to the Internet via the network gateway; and
a network device for connecting a plurality of slave network devices, each of the slave network devices communicating with the network device by using a different IP address, the network device comprising:
an IPsec module for establishing an IPsec tunnel to the network gateway in the Internet and retrieving an IPsec IP address corresponding to the IPsec tunnel; and
a NAT module for converting the different IP addresses of the slave network devices to the same IPsec IP address, such that the slave network devices share the IPsec tunnel and use the same IPsec IP address to communicate with the network gateway through the IPsec tunnel;
wherein the IPsec tunnel ends at the network device and the network gateway without extending to any of the slave network devices.

9. The IPsec system according to claim 8, wherein the network device is a cellular base station, a router, or a wireless AP, each of the slave network devices is a cellular base station, a router, a wireless AP, or a mobile device, and the network gateway is a security gateway.

10. The IPsec system according to claim 8, wherein the IPsec module comprises an encryption unit and a decryption unit, the encryption unit encrypts packets that are initiated from the slave network devices and not protected by IPsec encryption into packets that are protected by IPsec encryption, and the decryption unit decrypts packets that are destined for the slave network devices and protected by IPsec encryption into packets that are not protected by IPsec encryption, and the slave network devices share the services provided by the encryption unit and the decryption unit of the IPsec module of the network device.

11. The IPsec system according to claim 8, wherein the slave network devices communicate with the network device by using different private IP addresses, the NAT module converts the different private IP addresses of the slave network devices to the same IPsec address, and the NAT module records the relationship between the different private IP addresses of the slave network devices and ports of the network device in a NAT lookup table.

12. The IPsec system according to claim 8, wherein the slave network devices communicate with the network device by using different private IP addresses, the NAT module converts the same IPsec address to the different private IP addresses of the slave network devices, and the NAT module records the relationship between the different private IP addresses of the slave network devices and ports of the network device in a NAT lookup table.

13. The IPsec system according to claim 8, wherein the network gateway comprises an encryption unit and a decryption unit, the encryption unit encrypts a packet transmitted by the network gateway to the network device, the decryption unit decrypts an encrypted packet received from the network device.

14. The IPsec system according to claim 8, wherein the IPsec module is configured in IPsec tunnel mode to establish the IPsec tunnel to the network gateway in the Internet, and to establish the IPsec tunnel for the slave network devices to share, the network device receives only one certificate for authentication from the network gateway.

15. The IPsec system according to claim 8, wherein the slave network devices do not have IPsec functionality and are not capable of performing IPsec encryption and decryption.

16. A method for establishing IPsec tunnel, comprising:
establishing an IPsec tunnel from a network device to a network gateway and retrieving an IPsec IP address corresponding to the IPsec tunnel, the network device connecting a plurality of slave network devices, each of the slave network devices communicating with the network device by using a different IP address; and
converting the different IP addresses of the slave network devices to the same IPsec IP address, such that the slave network devices share the IPsec tunnel and use the same IPsec IP address to communicate with the network gateway through the IPsec tunnel;
wherein the IPsec tunnel ends at the network device and the network gateway without extending to any of the slave network devices.

17. The method according to claim 16, wherein the step of establishing the IPsec tunnel from the network device to the network gateway is configured in IPsec tunnel mode, and the network device receives only one certificate for authentication from the network gateway.

18. The method according to claim 16, wherein the step of converting the different IP addresses of the slave network devices to the same IPsec IP address is performed by a NAT method.

19. The method according to claim 18, wherein the NAT method converts different private IP addresses of the slave network devices to the same IPsec address and records the relationship between the different private IP addresses of the slave network devices and ports of the network device in a NAT lookup table.

20. The method according to claim 16, wherein the slave network devices do not have IPsec functionality and are not capable of performing IPsec encryption and decryption.

* * * * *